US008832002B2

(12) United States Patent
Fu et al.

(10) Patent No.: US 8,832,002 B2
(45) Date of Patent: Sep. 9, 2014

(54) COMPUTER IMPLEMENTED METHOD FOR THE AUTOMATIC CLASSIFICATION OF INSTRUMENTAL CITATIONS

(76) Inventors: Lawrence Fu, New York, NY (US); Konstantinos (Constantin) F. Aliferis, New York, NY (US)

( * ) Notice: Subject to any disclaimer, the term of this patent is extended or adjusted under 35 U.S.C. 154(b) by 384 days.

(21) Appl. No.: 12/614,320

(22) Filed: Nov. 6, 2009

(65) Prior Publication Data
US 2010/0217731 A1 Aug. 26, 2010

Related U.S. Application Data

(60) Provisional application No. 61/112,553, filed on Nov. 7, 2008.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | | |
|---|---|---|---|---|
| 7,117,185 | B1 * | 10/2006 | Aliferis et al. .................. | 706/12 |
| 2002/0156760 | A1 * | 10/2002 | Lawrence et al. ................ | 707/1 |
| 2005/0289199 | A1 * | 12/2005 | Aphinyanaphongs et al. ............. | 707/205 |
| 2008/0101689 | A1 * | 5/2008 | Forman ........................ | 382/159 |

OTHER PUBLICATIONS

Leopold, Edda; Kindermann, Jörg. "Text Categorization with Support Vector Machines. How to Represent Texts in Input Space?." Machine Learning 46.1 (2002): 423-444.*

Aphinyanaphongs, Y; Aliferis, C.F. "Text Categorization Models for Retrieval of High Quality Articles in Internal Medicine." AMIA 2003 Symposium Proceedings (2003): 31-35.*

Elmer V. Bernstam, Jorge R. Herskovic, Yindalon Aphinyanaphongs, Constantin F. Aliferis, Madurai G. Sriram, William R. Hersh, Using Citation Data to Improve Retrieval from MEDLINE, Journal of the American Medical Informatics Association, vol. 13, Issue 1, Jan.-Feb. 2006, pp. 96-105.*

Yindalon Aphinyanaphongs, Alexander Statnikov, Constantin F. Aliferis, A Comparison of Citation Metrics to Machine Learning Filters for the Identification of High Quality Medline Documents, Journal of the American Medical Informatics Association, vol. 13, Issue 4, Jul.-Aug. 2006, pp. 446-455.*

Herskovic, Jorge R.; Bernstam, Elmer V. "Using Incomplete Citation Data for Medline Results Ranking." AMIA 2005 Symposium Proceedings (2005): 316-320.*

Leopold, Edda; Kindermann, Jörg. "Text Categorization with Support Vector Machines. How to Represent Texts in Input Space'?." Machine Learning 46.1 (2002): 423-444.*

Aphinyanaphongs, Yin; Aliferis, Constantin. "Learning Boolean Queries for Article Quality Filtering." MEDINFO 2004 (2004): 263-267.*

Garzone, M. and R.E. Mercer. Towards an automated citation classifier. In Canadian Conference on AI. 2000.*

* cited by examiner

*Primary Examiner* — Kakali Chaki
*Assistant Examiner* — Daniel Pellett
(74) *Attorney, Agent, or Firm* — Laurence A. Weinberger (57) ABSTRACT

The learning method taught in this patent document is significantly different from previous methods for automatic classification of citations that are labor intensive and subject to human bias and error. The present invention automatically generates and avoids these limitations. A set of operational definitions and features uniquely suited to the scientific literature is disclosed along with their use with a learning method that is capable of analyzing the textual content of articles along with bibliometric data to accurately classify instrumental citations.

19 Claims, 2 Drawing Sheets

Figure 1: Learning

Figure 2: Classifying

COMPUTER IMPLEMENTED METHOD FOR THE AUTOMATIC CLASSIFICATION OF INSTRUMENTAL CITATIONS

Benefit of U.S. Provisional Patent Application No. 61/112,553 filed on Nov. 7, 2008 is hereby claimed.

BACKGROUND OF THE INVENTION

1. Field of the Invention

A method for automatically classifying a citation is disclosed with particular relevance to biomedical journal articles.

2. Description of Related Art

Evaluating the quality and impact of the scientific literature with citation count assumes that a citation is an indicator of quality. This is not necessarily true since a citation may serve many purposes unrelated to recognizing the value, rigor, or authority of the cited paper [1-3]. Cited papers may provide background information or acknowledge prior work that influenced the current work. Moreover, citations may serve non-scientific purposes due to social-psychological factors [4-6]. Thus, a citation is a subjective, indirect quality measure that does not have a single unambiguous use. On the other hand, a citation may criticize another work and not be an endorsement. Garfield created one of the earliest lists for the many possible reasons for a citation [7]:

1. Paying homage to pioneers
2. Giving credit to related work
3. Identifying methodology, equipment, etc.
4. Providing background reading
5. Correcting one's own work
6. Correcting the work of others
7. Criticizing previous work
8. Substantiating claims
9. Alerting to forthcoming work
10. Providing leads to poorly disseminated, poorly indexed, or uncited work
11. Authenticating data and classes of fact (physical constants, etc.)
12. Identifying original publications in which an idea or concept was discussed
13. Identifying original publication or other work describing an eponymic concept or term
14. Disclaiming work or ideas of others (negative claims
15. Disputing priority claims of others (negative homage)

Previous work has attempted to automatically classify citations according to the purpose of the citation [8-10]. Teufel automatically classified citation function based on cue phrases and a part-of-speech based recognizer [10]. Citations were assigned to one of twelve categories that reflected whether the citation described a weakness in the cited paper, compared or contrasted the work, praised or described an influential aspect of the work, or was neutral. The corpus contained conference articles in computational linguistics from the Computation and Language E-Print Archive (http://xxx.lanl.gov/cmp-lg), and the evaluation corpus contained 2829 citations from 116 articles. The corpus was manually labeled according to a classification scheme of 12 categories, and performance was evaluated by using the IBk algorithm as the learning method which is a k-nearest neighbor classifier. The results yielded Kappa and Macro-F values of 0.57, and percentage accuracy was 0.77. When the classifications were combined into the four general categories, Kappa was 0.59, Macro-F was 0.68, and percentage accuracy was 0.79.

Garzone and Mercer [8] proposed another method for automatically classifying citations. They believed that scientific writing utilizes certain phrases for persuasion that indicate the underlying rhetorical purpose of a citation and that citations can be classified with these phrases. Linguistic cues or phrases were manually identified from Physics and Biochemistry articles. For example, a citation in the results section containing the words "postulated", "reads", or "reported" was classified into a specific category. Their parser consisted of lexical rules based on cue words and grammar-like parsing rules to match sophisticated patterns. The classification scheme contained 35 categories with 195 lexical rules and 14 parsing rules.

Automatically classifying citations could improve citation indexers since the nature of the relationship between articles would be known. Researchers and users could determine if an article criticizes, praises, builds upon, or compares itself to a cited article [10]. Current indexers find articles citing a given article but would be more helpful if they could identify articles using similar techniques or ones presenting conflicting results [9]. Automatic classification could also make large databases of articles more manageable by identifying related articles and performing information extraction or text summarization [9].

Another potential benefit of classifying citations is improving citation metrics such as journal impact factor and article citation count. The performance of existing evaluation methods may improve if instrumental citations could be reliably distinguished from non-instrumental ones. Modified versions of citation count and journal impact factor will be better quality metrics if they only counted citations to papers that played a central role in the generation of the hypothesis or provided necessary foundational knowledge.

BRIEF SUMMARY OF THE INVENTION

This patent disclosure describes a methodology using machine learning methods for automatically classifying citations found in an extensive database of references. In this patent document, the method is described by application to the biomedical field. The biomedical literature, particularly that represented in the MEDLINE database, is much more general than in other scientific disciplines containing a broad range of articles ranging from laboratory research reports, to medical histories, to anecdotal data, to commentary. Therefore, when attempting to conduct bibliographic research in a biomedical field, the MEDLINE database provides an ideal test case since it is harder to identify those citations of particular value from those of lesser value. Although the invention is presented with respect to the biomedical literature, the method is applicable to any literature or database of articles containing citations.

A critical step in achieving the automatic classification was the recognition that a strict and unique definition of citation type was first necessary. For the purposes of patent disclosure, a citation was considered "instrumental" if either of the following rules were true: the hypothesis of the citing work was motivated by the cited work, or the citing work could not have been completed without the cited work. Conversely, "non-instrumental" citations satisfied neither of the above criteria. In addition, a set of features is identified that serve to describe the works in the literature with sufficient accuracy. This selection of the operational definition and features is sufficient to permit the application of the method to accurately classify articles found in a broad database such as in MEDLINE after a learning (or training) period on a corpus of references for which the response variable (instrumental or not) is known. The method's output also includes scores which provide a ranking according to how instrumental the citations are. The classification and ranking of references is demonstrated by taking a database of articles as input, using these articles as a training corpus, extracting features from the articles, and storing the output. The output can be applied to unseen documents (i.e, documents not used during training) to automatically identify and rank instrumental citations.

DETAILED DESCRIPTION OF THE INVENTION

Definitions:

The following are specific definitions for terms used in this patent document.

An article that cites another work is called the 'CITING WORK'.

The article that receives a citation is called the 'CITED WORK' or 'REFERENCE '.

A 'CITATION ' is the location in the text where a reference is cited which is typically denoted with a reference number in superscript or brackets.

The 'CITATION TEXT' is the text surrounding the citation. Furthermore, a reference may be cited multiple times within the same article. Equivalently, a citing article may contain many citations to the same reference. The citation text for each citation is unique and consists of the text surrounding each citation.

For a specific example, consider the first citation in the second sentence of the Description of Related Art above: "This is not necessarily true since a citation may serve many purposes unrelated to recognizing the value, rigor, or authority of the cited paper [1-3]." This patent document is the citing work, and references [1-3] are the three cited works. The citation text is the sentence "This is not necessarily true . . . " The citation text can include any number of words before or after the citation.

Operational Definition of Corpus References:

For the method of the present invention to work, a definition for an instrumental citation was required for labeling the corpus. Here, a citation is operationally defined as instrumental if either of the following rules was true for a citation:

I. The hypothesis of the citing work was motivated by the cited work.

II. The citing work could not have been completed without the cited work.

An example of a reference motivating the hypothesis of a work is shown in this excerpt [11]:

"Recently, it has been suggested that endothelium-dependent dilatation of resistance vessels in coronary and other vascular beds is impaired in hypertension and hypercholesterolemia[10,11,12,13]. Therefore, altered endothelium-dependent vasomotion of coronary resistance vessels may contribute to the cause of angina-like chest pain in patients with normal coronary arteries. The present study attempted to determine whether endothelium-dependent vasodilatation of coronary resistance vessels was impaired in patients with this syndrome."

In this case, the citing paper investigated whether endothelium-dependent vasodilatation of the coronary vasculature was impaired in patients with microvascular angina [11]. The citation text states that references 10-13 stimulated the hypothesis of the article and that the article builds on the cited work. Therefore, these citations are labeled instrumental.

For the second rule, there are many ways to interpret that a reference was necessary for completing a paper. A reference was instrumental if it provided foundational knowledge. A good example is reference 7 in an article investigating the connection between secondhand smoke and lung cancer [12]. The study exposed non-smokers to secondhand smoke and found metabolites of the tobacco-specific lung carcinogen NNK in their urine. A reference had shown that NNK induced tumors in rats: "NNK is a powerful pulmonary carcinogen, inducing predominantly adenocarcinomas in the lungs of rats, mice, and hamsters regardless of the route of administration[5,6,7]" [12]. The relationship between NNK and lung cancer is necessary to prove the hypothesis of the citing work which makes the citation instrumental.

Other criteria for instrumental references include: 1) if it addressed the weaknesses or limitations of prior work as part of its hypothesis; 2) or used an experimental technique that was essential for completing the study. Also, the reference could have conducted related work involving other animals, diseases, or organ systems that led to findings applicable to the citing work.

An example of a non-instrumental citation is one related to a statistical method or computer software. These tools likely did not motivate the hypothesis, and the study probably could have been completed with alternative methods. Non-instrumental citations were also identifiable if the article explicitly made it clear that the cited work did not influence the hypothesis or the design of the study such as reference 28 in this citation: "We examined several potential mechanisms that might explain our results[27,28,29]" [13]. The citation indicated that the references were considered after the experiments were completed which meant they did not motivate the hypothesis.

A machine learning approach is utilized to automatically classify citations. Support vector machine (SVM) models are one type of used learning method, and there are other possible learning techniques that could be used with the inventive method. SVM models were used in the present disclosure. The inventors have used SVM models in developing their method and are exemplified in the present disclosure. SVM models are a supervised learning method where a kernel function maps the input space to a higher-dimensional feature space, and a hyperplane is calculated to separate the classes of data [14]. The optimal hyperplane is the solution to a constrained quadratic optimization problem. SVM models are usually sparse since the solution depends on the support vectors or points closest to the hyperplane [15]. Most features have zero weights, and the number of support vectors will be much smaller than the number of instances in most cases. This property makes SVMs suitable for representing text which typically involves high-dimensional data. Prior research has demonstrated that they perform well in categorizing text and identifying high-quality articles [16-17].

The corpus is created by extracting input features from the set of articles. The method is not restricted to the input features presented here. In this example of the method, terms from MEDLINE records and the Web of Science are used as input features. MEDLINE is a bibliographic database of articles published in the biomedical literature, and it is provided by the National Library of Medicine. The Web of Science is a commercial citation database maintained by Thomson Reuters. Other data sources can be used with the method. In the examples of this patent document, the learning method is trained on content and bibliometric features. Content features include the citation text, title, abstract, and MeSH terms from MEDLINE. MeSH terms are medical subject heading terms used in MEDLINE to provide information about the topic of an article. Bibliometric features include the number of times a reference was cited in each section (i.e., introduction, methods, etc.) as well as the publication history of the first and last authors. Previous approaches used manually generated rules which can be labor intensive or subject to human bias. Machine learning models are automatically generated and not susceptible to these limitations. To utilize the SVM learning methodology, it is necessary to define the input features (or citation characteristics) that will be used in the analysis. It is then necessary to determine the response variable for each of the citations in the learning corpus. For the biomedical literature, the following features were selected:

Features Included in Method for Automatically Classifying Citations

TABLE 1

| Feature | MEDLINE indexed reference | Non-MEDLINE indexed reference |
|---|---|---|
| Article title | x | x |
| Article abstract | x | |
| MeSH terms | x | |
| Citation text | x | x |
| Number of times cited in Introduction | x | x |
| Number of times cited in Methods | x | x |
| Number of times cited in Results | x | x |
| Number of times cited in Discussion | x | x |
| Citation count of reference | x | |
| Number of articles for first author | x | |
| Number of citations for first author | x | |
| Number of articles for last author | x | |
| Number of citations for last author | x | |
| Number of authors | x | |
| Number of institutions | x | |
| Quality of first author's institution | x | |

Table 1 lists the input features used to construct a learning corpus in the disclosed implementation of the method. The "Citation text" includes a window of 25 words before and after each citation. The "Number of times a reference was cited in each section" is included since it indicates the relative importance of a reference. For example, an instrumental reference is frequently cited more in the discussion rather than the introduction or vice versa. The "Citation count of the reference" is calculated either for 10 years after publication to allow sufficient time for citation count to stabilize or calculated until the citing article was published. For example, if the cited paper was published in 1981 while the citing paper was published in 1994, citations would be counted for 1981-1991. If the cited paper was published in 1990 while the citing paper was published in 1994, citations would only be counted from 1990 until 1993. This adjustment ensures that only information available at publication time is used. The "Number of articles or citations for first and last authors" is counted for 10 years prior to publication. The 10 year window was chosen to allow sufficient time for counts to stabilize, but other windows are possible. The "Number of institutions" refers to unique home institutions for all authors. The Academic Ranking of World Universities (ARWU) [18] is used as the measure of "Quality for first author's institution." All other variables listed in Table 1 are self-explanatory. MEDLINE and Web of Science do not index references such as books, reports, guidelines, and articles from some journals. In these cases, input features are limited to the article title, number of times cited in each section, and the citation text. Corresponding records were found in the Institute of Scientific Information (ISI) Web of Science (WOS) [19] if they were indexed, and all desired bibliometric information was downloaded.

In order to label references in the training corpus, manual human review is employed. This is considered a gold standard. Each citation is labeled either instrumental or non-instrumental based on its relevance to the hypothesis of the citing work. As noted above, the citation is labeled instrumental if the reference motivated the hypothesis or the citing work could not have been completed without the reference. It is possible that another method could be developed in the future to provide an alternative gold standard.

Experimental Results:

Learning Corpus Construction:

The corpus was defined for a set of topics and dates. Eight topics were chosen to cover a wide range of topics from internal medicine as defined by the MeSH vocabulary: Cardiology, Endocrinology, Gastroenterology, Hematology, Medical Oncology, Nephrology, Pulmonary Disease, and Rheumatology. An article was relevant to a topic if its MEDLINE record contained one of the eight MeSH terms, a related topic from the "See Also" field of the MeSH record, or a term in a sub-tree of these terms [20]. For example, an article was Cardiology-related if its record contained the MeSH heading "Cardiology", a related term such as "Cardiovascular Diseases", or a sub-term of one of these terms. The corpus consisted of all New England Journal of Medicine articles related to internal medicine that were published in 1993 and 1994. Articles from other journals were not included since the full text of articles was not accessible online for this time period.

The full text of the articles was downloaded from the New England Journal of Medicine website. Reviews and special articles without an obvious hypothesis were removed since it was not possible to identify instrumental citations according to the operational definition. Three references were randomly selected from each article, and all citations to these references were identified. The final corpus contained 1310 citations from 272 articles. Each citation was manually reviewed and labeled as instrumental or non-instrumental. The ratio of instrumental to non-instrumental citations was 949 to 361.

Document Representation and Learning Method:

Articles are formatted for learning by text preprocessing and term weighting. The title, abstract, and MeSH terms are extracted from MEDLINE records. Stop words (such as "the" or "a") [21] are removed from the title and abstract. Multiple forms of the same word are eliminated with the Porter stemming algorithm [22] to reduce the dimensionality of the input space.

Terms are weighted using log frequency with redundancy [17]. The first step is weighting the number of times a term appeared in a document with a log frequency. Second, the log frequency is multiplied by an importance weight (i.e. redundancy). Redundancy measures how uniformly distributed a term is throughout a corpus. A term appearing in all documents is not helpful for classification, and a term appearing many times in one article while occurring once in each of the remaining articles is more discriminative [17].

The redundancy value for term k, $r_k$, is:

$$r_k = \log N + \sum_{i=1}^{N} \frac{f(w_k, d_i)}{f(w_k)} \log \frac{f(w_k, d_i)}{f(w_k)}$$

where N is the number of documents in the corpus, $f(w_k, d_i)$ is the number of occurrences of term k in document i, and $f(w_k)$ is the number of occurrences of term k in the corpus. The final step is L2-normalization to account for different text lengths. The vector of feature weights for a document i, $x_i$, is:

$$x_i = \frac{l_i * r}{\|l_i * r\|_{L2}}$$

where $l_i$ is a vector of the log frequencies for all terms in document i, r is a vector of redundancy values for all terms in the corpus, "$l_i*r$" signifies component multiplication, and "$\|l_i*r\|_{L2}$" is the L2-norm of the resultant vector. Each weight has a value between 0 and 1. In the end, the corpus is represented as a matrix where rows corresponded to documents and columns represented terms. Bibliometric features were scaled linearly between 0 and 1 by being divided by the difference between the maximum and minimum values for a given feature.

Support vector machine (SVM) models are used as the learning method and are trained with a combination of content and bibliometric features.

Learning and Error Estimation:

In the present implementation of the method, 5-fold nested cross validation was used. Parameters are optimized for cost and degree in the inner loop while the outer loop produces an unbiased estimate of predictivity. The set of costs is [0.1, 0.2, 0.4, 0.7, 0.9, 1, 5, 10, 20], and the set of degrees is [1, 2, 3, 4, 5, 8]. Performance is measured by area under the receiver operating characteristic curve (AUC). At the end of the cross-validation procedure, the output of the method consists of SVM weights for each feature. The weights characterize the separating hyperplane that is learned during training.

Experiments were repeated with 3 variations. First, the corpus was separated by publication year (i.e., articles from 1993 and 1994) to see if performance was significantly different between the two years. Second, a hold out data set was excluded before training Cross-validation and model training were performed on the training examples, and performance was evaluated on the hold out set. The hold out set was randomly selected as 30% of the citations, and results were averaged over 5 runs. Prospective validation was also performed where the output of the method was derived from training on the 1993 articles and applied to the 1994 articles. The results for the hold out sets and prospective validation indicated whether the method, using the previously generated output, is able to classify citations in unseen articles. If these results are similar to the cross-validation results, the method should be able to handle unseen cases. The experimental results confirmed the method's ability to classify unseen cases since the hold out set results were similar to the prospective validation results.

The third experimental variation was randomly selecting one citation per reference and excluding the remaining citations from the analysis. Using only one citation per reference ensured that the data was independently and identically distributed. In the original experiments, citations to the same reference could occur in the training set as well as the testing set. This could be problematic since citations to the same reference are not independent. A citation is more likely to be instrumental if another citation to the same reference is instrumental. Furthermore, citations from the same reference would never occur in both the training set and unseen articles. This restriction resulted in a corpus of 816 citations.

Analysis of Influential Features:

List of Features Included in the Content and Bibliometric Output

TABLE 2

| Feature | Content Output | Bibliometric Output |
|---|---|---|
| Article title | x | |
| Article abstract | x | |
| MeSH terms | x | |
| Citation text | x | |
| Number of times cited in Introduction | | x |
| Number of times cited in Methods | | x |
| Number of times cited in Results | | x |
| Number of times cited in Discussion | | x |
| Citation count of reference | | x |
| Number of articles for first author | | x |
| Number of citations for first author | | x |
| Number of articles for last author | | x |
| Number of citations for last author | | x |
| Number of authors | | x |
| Number of institutions | | x |
| Quality of first author's institution | | x |

Influential features were identified using two methods. First, the method was trained on either the content or bibliometric data (reduced features). Table 2 shows the features included in each output. Performance of the method outputs reveals whether one type of feature is more important than the others. The second type of analysis reduced the total number of features by selecting the Markov Blanket of the response variable (i.e., number of citations received). The Markov Blanket is a set of features conditioned on which all remaining features are independent of the response variable. It excludes irrelevant and redundant variables without compromising predictivity, and it provably results in maximum variable compression under broad distributional assumptions [23]. The specific algorithm used was semi-interleaved HITON-PC without symmetry correction which is an instance of the Generalized Local Learning class of algorithms [23]. After variable selection, logistic regression estimated the magnitude of each feature's effect and its statistical significance while controlling for all other features in the logistic regression model.

Hardware and Software Implementation Details:

Due to the large numbers of entries in the reference sets that need to be classified, for all practical purposes the invention is best practiced by means of a software program (hardware instruction set) running on a general purpose digital computer. Based on the complete disclosure of the method in this patent document, software code designed to implement the invention may be written by those reasonably skilled in the software programming arts in any one of several standard programming languages. The inventors utilized Python scripts that were easily adapted for this purpose. The software program may be stored on a computer readable medium and implemented on a single computer system or across a network of computers linked to work as one. Many desktop computer systems available today are satisfactory (will provide results in a reasonable time) provided they have a reasonably fast processor (1.8 GHz or greater), access to ample random access memory (RAM) to handle the large data sets (1 GB or greater), and ample hard disk storage capability. Slower processors may be used but will extend processing time. Faster processors or networked machines with greater amounts of RAM may be needed to handle very large data sets in a reasonable time. These parameter choices are all within the skills of those persons familiar with the computing arts. The inventors have used an Intel Xeon CPU 1.8-2.4 GHz with 4 GB of RAM and 160 GB hard disk. The results of the automatic classification are output on a visually perceptible medium, typically a computer display or printed medium. The classified references may be retained in a database for future knowledge based searching. The database may be retained in a computer readable medium such as a hard disk or computer readable storage medium such as a CD, DVD, etc. Typically, the output of the method (generated on the learning corpus) is retained on a computer readable medium but may also be output on a visually perceptible medium such as a computer display or printed medium. When SVMs are used as the learning method, the output of the method is defined by the weights that are learned during training.

Corpus construction and feature weighting were implemented by the inventors in Python scripts. For text-based features, the scripts constructed PubMed queries, retrieved desired articles, downloaded MEDLINE records, and preprocessed text. For bibliometric features, the WOS database was queried with the title, author, and journal of each article. If a match was found, a user session was simulated by navigating through the website and extracting desired information about the document and authors.

The remainder of the software code was written in Mathworks MATLAB. LIBSVM was used to train SVM models, and it included a MATLAB interface [24]. Scripts were written to perform cross-validation and estimate performance. A MATLAB implementation for HITON was used from Causal Explorer which is freely available [25]. The logistic regression implementation of the MATLAB statistics toolbox was also used.

Results:
Cross-validation AUC Results for the Classification of Citations Experiments:

TABLE 3

| Corpus | Cross-validation AUC | Hold Out Test Set AUC |
| --- | --- | --- |
| Full Corpus | 0.86 | 0.85 |
| 1993 articles | 0.87 | 0.84 |
| 1994 articles | 0.81 | 0.81 |
| Train 1993, Test 1994 | N/A | 0.78 |

The cross-validation results in Table 3 demonstrate the utility and validity of the present invention namely, that it is possible to accurately classify instrumental citations. The method trained on the full corpus had an AUC of 0.86. An AUC of 0.5 describes a random classifier, an AUC of ~0.75 a mediocre classifier, an AUC of ~0.85 a very good classifier, and an AUC >0.9 an excellent classifier. Comparable performance was shown when the corpus was split up by year. AUC values were 0.87 and 0.81 for the 1993 and 1994 articles. Additional experiments were performed which excluded test cases before learning. Performance decreased slightly when a hold out test set was used. Cross-validation results decreased from 0.86 to 0.85 for the full corpus, from 0.87 to 0.84 for 1993 articles, and were constant for 1994 articles The slight overfitting probably resulted from excluding test set information during feature weighting and scaling. Cross-validation weighted and scaled features with all corpus items without excluding the test set. For the text features, feature weighting calculated term distributions for redundancy values. Cross-validation included the test set in these computations while hold-out experiments did not. For the bibliometric data, cross-validation scaled features over the range of values for all articles, while hold out experiments only considered training cases.

Classification Results after Restricting Corpus to One Citation Per Reference:

TABLE 4

| Corpus | All Citations (AUC) | 1 Citation per Reference (AUC) |
| --- | --- | --- |
| Full Corpus | 0.86 | 0.82 |
| 1993 articles | 0.87 | 0.86 |
| 1994 articles | 0.81 | 0.77 |

In the previous experimental results shown in Table 3 deleted per NTF return, it was possible for citations to the same reference to occur both in the training and testing sets. Experiments were repeated after limiting the corpus to one citation per reference. The results presented in Table 4 show that learning with one citation per reference reduced classification performance. Cross-validation results decreased from 0.86 to 0.82 for the full corpus, from 0.87 to 0.86 for 1993 articles, and from 0.81 to 0.77 for 1994 articles. This finding is not surprising since citations to the same reference are not independent, and classification is probably easier when citations to the same reference occur in both the training and testing sets. However, and most importantly, even with the limitation to one reference, the method of the invention accurately classifies instrumental citations.

Analysis of Influential Features:

Learning was performed on feature subsets to investigate whether content or bibliometric features were more important for classification. AUC performance was 0.86 for the method when using all features, 0.83 when the method used only content features, and 0.77 when the method used only bibliometric features. The content-only method slightly outperformed the bibliometric-only method, but both preformed well even when run separately. Clearly, both types contributed to the accuracy of the complete output. In the preferred embodiment of the invention, both methods are used.

Another method for identifying influential features involves Markov Blanket induction and Logistic Regression. Markov Blanket induction selects only non-redundant and relevant features, and Logistic Regression estimates feature importance and statistical significance of the selected features. Cross-validation with the full corpus yielded 12912 features which were reduced to 67 features.

The inventive method described in this patent document may be applied to other extensive databases by selection of features or definitions appropriate to those databases. For each such database, the method will produce an output appropriate to that database; i.e., SVM weights if SVM models are used as the learning method. Furthermore, the weights found for a database of physics references will not necessarily be the same as the weights found for a biomedical database. The important result demonstrated by the experimental data is that using the unique set of operational definitions and features described above, the method is able to accurately classify citations according to a gold standard, the individual rater's notion of an instrumental citation. There may be other gold standards that will become obvious to those skilled in the art as this technique becomes more widely known and adopted.

The results presented here show that the method works for a broad based database containing many types of different references such that the method can be validly extended to other databases across the literature. The specific implementation choices shown here are one of the numerous ways that the method can be applied.

Figure 1:
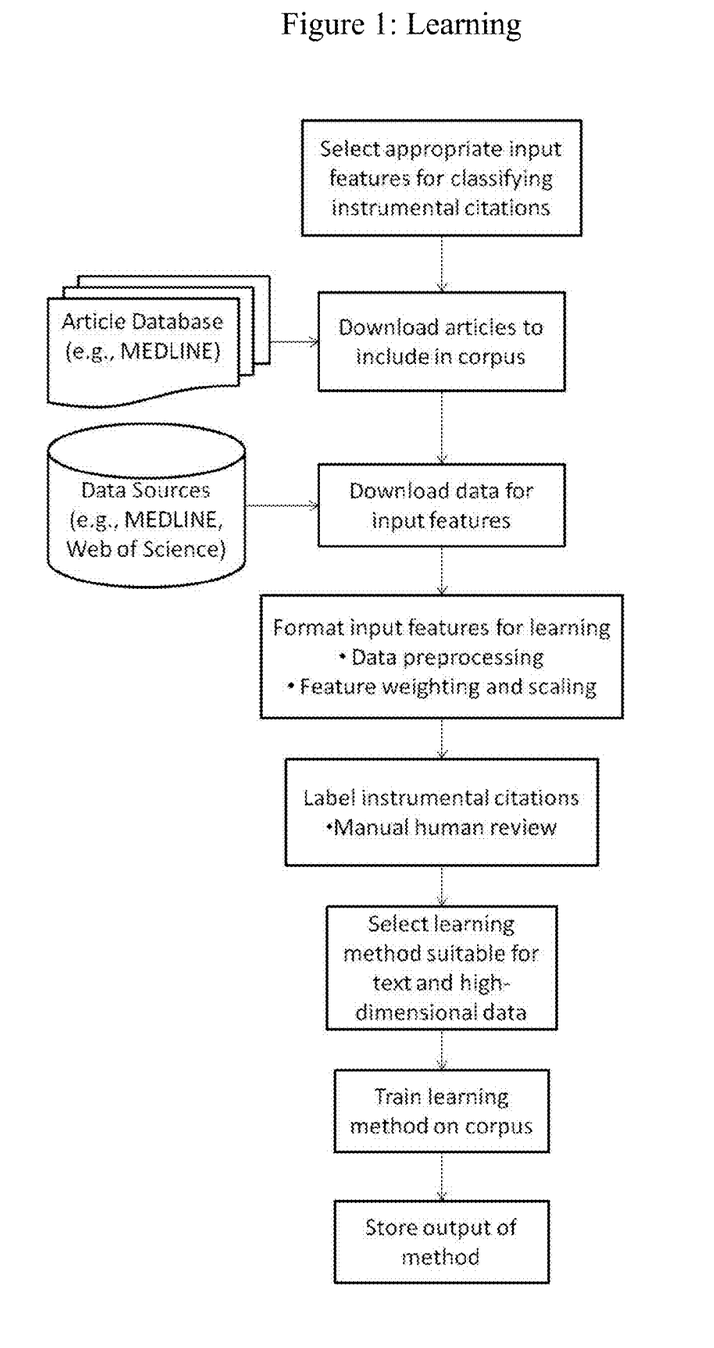
FIG. 1 is a flow sheet of the learning method features of the invention.
Figure 2:
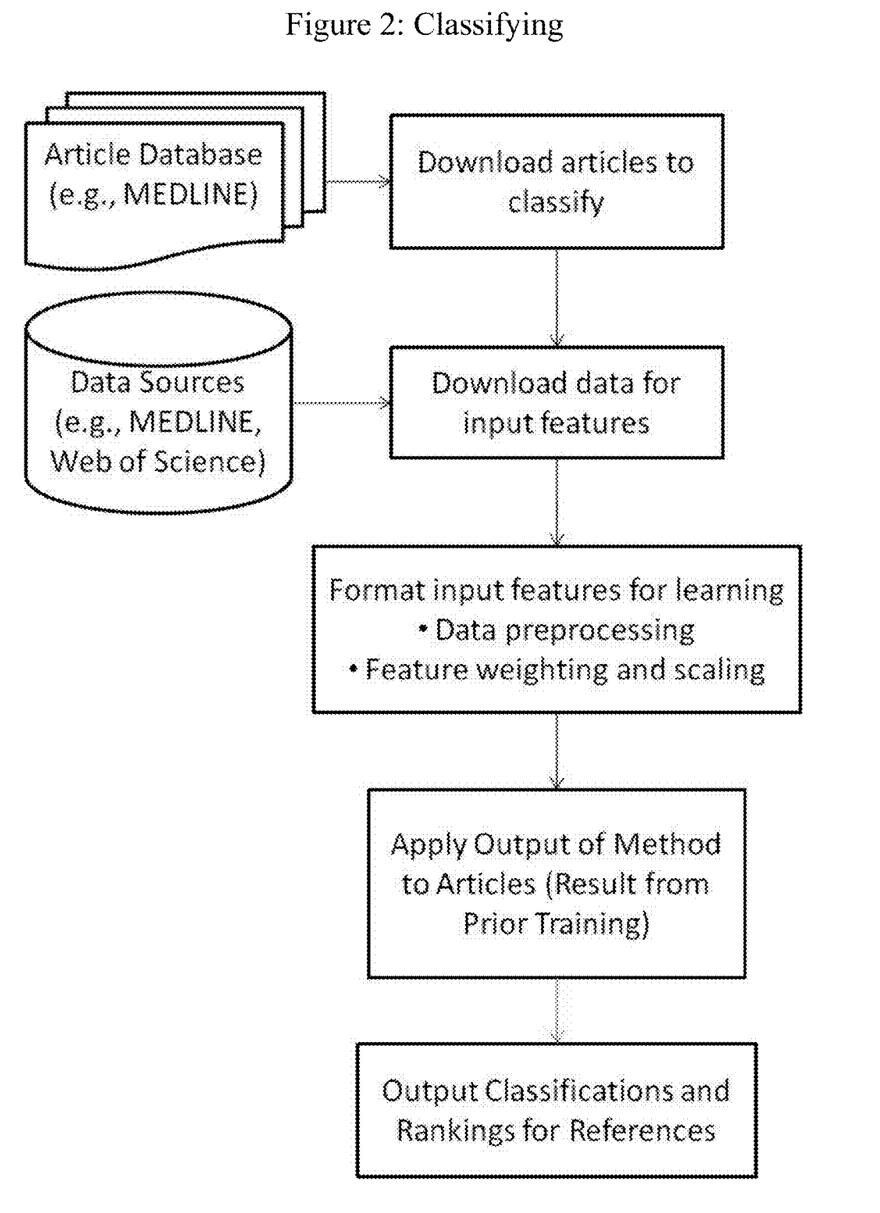
FIG. 2 is a flow sheet of the classifying method features of the invention.

The inventors have demonstrated that it is possible to automatically and accurately classify references. The method takes as input a database of articles, uses these articles as a training corpus, and produces an output to automatically identify and rank instrumental citations. The basic steps in the inventive method are shown in FIG. 1 and FIG. 2, and the steps are summarized as follows:

Basic Steps for Learning:
1. selecting appropriate input features for classifying instrumental citations (exemplified for biomedical literature by use of the features taught herein);
2. downloading articles for corpus from article database;
3. downloading data for input features from data sources;
4. formatting input features for learning by performing data preprocessing, feature weighting, and feature scaling;
5. labeling citations as instrumental or non-instrumental with manual human review (or other appropriate gold standard);
6. selecting a learning method (such as an SVM model taught herein);
7. training the learning method (including performing model selection and estimating error including cross validation);
8. outputting the results (ranked list of instrumental citations)

To apply the method to a new corpus of documents similar to the corpus that the method was trained on, the output of the training is applied to new documents using the following basic steps:
1. downloading articles for citation classification;
2. downloading data for input features from data sources;
3. formatting input features by performing data preprocessing, feature weighting, and feature scaling;
4. applying the output derived from training to articles
5. outputting the classification and ranking results for references More specifically, as an exemplary application, this patent document has taught a set of features and response variable (citation type) uniquely suited for classifying references in the biomedical literature found on MEDLINE.

REFERENCES

1. MacRoberts, M. and B. MacRoberts, *Problems of citation analysis*. Scientometrics, 1996. 36(3): p. 435-444.
2. Phelan, T., *A compendium of issues for citation analysis*. Scientometrics, 1999. 45(1): p. 117-136.
3. Seglen, P., *Citation rates and journal impact factors are not suitable for evaluation of research*. Acta Orthop Scand, 1998. 69(3): p. 224-9.
4. Bornmann, L. and H. Daniel, *What do citation counts measure? A review of studies on citing behavior*. Journal of Documentation, 2007.
5. Cronin, B., *Metatheorizing Citation*. Scientometrics, 1998. 43(1): p. 45-55.
6. Nicolaisen, J., *The Social Act of Citing: Towards New Horizons in Citation Theory*. Proceedings of the 66th ASIST Annual Meeting, 2003: p. 12-20.
7. Garfield, E., *Can citation indexing be automated?* Essays of an Information Scientist, 1962. 1: p. 84-90.
8. Garzone, M. and R. E. Mercer. *Towards an automated citation classifier*. in *Canadian Conference on AI*. 2000.
9. Mercer, R. E. and C. DiMarco. *A design methodology for a biomedical literature indexing tool using the rhetoric of science*. in 2004 *Joint Conference on Human Language Technology/North American Association for Computational Linguistics (HLT-NAACL)*. 2004. Boston, Mass.
10. Teufel, S., A. Siddharthan, and D. Tidhar. *Automatic classification of citation function*. in *Proceedings of EMNLP*. 2006. Sydney, Australia.
11. Egashira, K., et al., *Evidence of Impaired Endothelium-Dependent Coronary Vasodilatation in Patients with Angina Pectoris and Normal Coronary Angiograms*. New England Journal of Medicine, 1993. 328(23): p. 1659-1664.
12. Hecht, S. S., et al., *A Tobacco-Specific Lung Carcinogen in the Urine of Men Exposed to Cigarette Smoke*. New England Journal of Medicine, 1993. 329(21): p. 1543-1546.
13. Siscovick, D. S., et al., *Diuretic Therapy for Hypertension and the Risk of Primary Cardiac Arrest*. New England Journal of Medicine, 1994. 330(26): p. 1852-1857.
14. Burges, C., *A tutorial on support vector machines for pattern recognition*. Data Mining and Knowledge Discovery, 1998. 2(2): p. 121-167.
15. Muller, K., et al., *An introduction to kernel-based learning algorithms*. IEEE Trans. on Neural Networks, 2001. 12(2): p. 181-201.
16. Aphinyanaphongs, Y., et al., *Text categorization models for high-quality article retrieval in internal medicine*. JAMIA, 2005. 12(2): p. 207-216.
17. Leopold, E. and J. Kindermann, *Text categorization with support vector machines*. Machine Learning, 2002. 46: p. 423-444.
18. *Academic Ranking of World Universities*. March 2009]; Available from: http://ed.sjtu.edu.cn/ranking2006.htm
19. *ISI Web of Science*. March 2009]; Available from: http://www.isiknowledge.com
20. *MeSH Browser*. August 2008]; Available from: http://www.nlm.nih.gov/mesh/MBrowser.html.
21. *Stopwords*. August 2008]; Available from: http://www.ncbi.nlm.nih.gov/books/bv.fcgi?rid=helppubmed.table.pubmedhelp.T43.
22. Porter, M., *An algorithm for suffix stripping*. Program, 1980. 14: p. 130-137.
23. Aliferis, C., et al., *Local Causal and Markov Blanket Induction for Causal Discovery and Feature Selection for Classification*. Submitted to JMLR, 2008.
24. *LIBSVM—A Library for Support Vector Machines*. August 2008]; Available from: http://www.csie.ntu.edu.tw/~cjlin/libsvm/.
25. Statnikov, A., et al., *Causal Explorer: A Matlab Library of Algorithms for Causal Discovery and Variable Selection for Classification*, in *Challenges in Causality. Volume 1: Causation and Prediction Challenge*, I. Guyon, et al., Editors. 2009, Microtome Publishing: Brookline, Mass.

We claim:

1. A computer implemented method for automatically classifying citations in a document database, comprising the following steps:
   A. identifying influential features for the citations in the database comprising the following steps:
   1) selecting appropriate input features for training;
   2) selecting citations from the database for analysis to form a learning corpus;
   3) acquiring data for input features;
   4) formatting input features for learning comprising the following steps:

a) data preprocessing;
b) feature weighting; and
c) feature scaling;
5) labeling citations in the learning corpus in view of a gold standard reference;
6) selecting a learning method;
7) training the learning method further comprising the following steps:
   a) acquiring the labeled citations in the learning corpus;
   b) employing model selection for finding the best models for the corpus that take into account the correlations among citations in the same document by selecting one or more citations per document; and
   c) deriving unbiased error estimates by applying error estimators that take into account the correlations among citations in the same document;
8) storing the output of the learning method; and
9) ranking the features as determined by the learning method; and B. applying the learned influential features to classify additional citations in a database comprising the steps of:
1) selecting citations for analysis from the database, not including citations used in the learning corpus, to form an application corpus;
2) acquiring data for input features;
3) formatting input features for learning comprising the following steps:
   a) data preprocessing;
   b) feature weighting; and
   c) feature scaling;
4) classifying the citations by applying the stored output of the learning method of step A.(8) to the citations; and
5) outputting the classification results for the citations.

2. The method of claim 1 in which the citations are labeled in step A.(5) as instrumental or non-instrumental.

3. The method of claim 2 in which the citations are labeled as considered instrumental if the citing work was motivated by the cited work or the citing work could not have been completed without the cited work.

4. The method of claim 1 in which the gold standard applied in step A.(5) is manual human review.

5. The method of claim 1 in which the learning method selected is an SVM model.

6. The method of claim 5 in which the SVM model outputs are SVM weights.

7. The method of claim 1 in which the following features are utilized:
a) title;
b) abstract;
c) citation text;
d) number of times cited in introduction;
e) number of times cited in methods;
f) number of times cited in results;
g) number of times cited in discussion;
h) citation count of reference;
i) number of documents for first author;
j) number of citations for first author;
k) number of documents for last author;
l) number of citations for last author;
m) number of authors;
n) number of institutions; and
o) quality of first author's institution.

8. A computer implemented method for automatically classifying citations in a document database, comprising the following steps:
A. identifying influential features for the citations in the database comprising the following steps:
1) selecting appropriate input features for classifying instrumental citations;
2) selecting citations from the database for analysis to form a learning corpus;
3) acquiring data for input features;
4) formatting input features for learning comprising the following steps:
   a) data preprocessing;
   b) feature weighting; and
   c) feature scaling;
5) labeling citations in the learning corpus as instrumental or non-instrumental in view of a gold standard reference of manual human review;
6) selecting a learning method;
7) training the learning method further comprising the following steps:
   a) acquiring the labeled citations in the learning corpus;
   b) employing model selection for finding the best models for the corpus that take into account the correlations among citations in the same document by selecting one or more citations per document; and
   c) deriving unbiased error estimates by applying error estimators that take into account the correlations among citations in the same document;
8) storing the output of the learning method; and
9) ranking the features as determined by the learning method; and B. applying the learned influential features to classify additional citations in a database comprising the steps of:
1) selecting citations for analysis from the database, not including citations used in the learning corpus, to form an application corpus;
2) acquiring data for input features;
3) formatting input features for learning comprising the following steps:
   a) data preprocessing;
   b) feature weighting; and
   c) feature scaling;
4) classifying the citations by applying the stored output of the learning method of step A.(8) to the citations; and
5) outputting the classification results for the citations.

9. The method of claim 8 in which the database is the MEDLINE database.

10. The method of claim 9 in which the following features are utilized:
a) title;
b) abstract;
c) MeSH terms;
d) citation text;
e) number of times cited in introduction;
f) number of times cited in methods;
g) number of times cited in results;
h) number of times cited in discussion;
i) citation count of reference;
j) number of documents for first author;
k) number of citations for first author;
l) number of documents for last author;
m) number of citations for last author;
n) number of authors;

o) number of institutions; and
p) quality of first author's institution.

11. The method of claim 8 in which the learning method selected is an SVM model.

12. The method of claim 11 in which the output of the SVM learning method in step A.(8) are SVM weights.

13. The method of claim 12 in which the database is the MEDLINE database.

14. The method of claim 8 in which the following features are utilized:
   a) title;
   b) abstract;
   c) citation text;
   d) number of times cited in introduction;
   e) number of times cited in methods;
   f) number of times cited in results;
   g) number of times cited in discussion;
   h) citation count of reference;
   i) number of documents for first author;
   j) number of citations for first author;
   k) number of documents for last author;
   l) number of citations for last author;
   m) number of authors;
   n) number of institutions; and
   o) quality of first author's institution.

15. A computer implemented method for automatically classifying citations in a document database, comprising the following steps:
   A) identifying influential features for the citations in the database comprising the following steps:
      i) defining a feature set;
      ii) labeling citations;
      iii) training the learning method further comprising the following steps:
         a) acquiring the labeled citations in the learning corpus;
         b) employing model selection for finding the best models for the corpus that take into account the correlations among citations in the same document by selecting one or more citations per document; and
         c) deriving unbiased error estimates by applying error estimators that take into account the correlations among citations in the same document;
      iv) storing the output of the learning method and the influential features; and
   B) applying the learned influential features to classify additional citations comprising the steps of:
      i) acquiring the influential features;
      ii) classifying the citations by applying the output of the learning method to the citations and
      iii) outputting the classification results.

16. The method of claim 15 in which the database is the MEDLINE database.

17. The method of claim 15 in which citations are labeled as instrumental or non-instrumental.

18. The method of claim 17 in which an SVM model is used as the learning method.

19. The method of claim 15 in which the following features are utilized:
   a) title;
   b) abstract;
   c) citation text;
   d) number of times cited in introduction;
   e) number of times cited in methods;
   f) number of times cited in results;
   g) number of times cited in discussion;
   h) citation count of reference;
   i) number of documents for first author;
   j) number of citations for first author;
   k) number of documents for last author;
   l) number of citations for last author;
   m) number of authors;
   n) number of institutions; and
   o) quality of first author's institution.

* * * * *